(12) United States Patent
Dwolinski

(10) Patent No.: US 10,823,641 B2
(45) Date of Patent: Nov. 3, 2020

(54) ROTATING DRUM OF A TIRE, WHEEL, AND/OR CHASSIS TEST STAND

(71) Applicant: ZF Friedrichshafen AG, Friedrichshafen (DE)

(72) Inventor: Thomas Dwolinski, Neuburg am Inn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 186 days.

(21) Appl. No.: 15/769,770

(22) PCT Filed: Sep. 26, 2016

(86) PCT No.: PCT/EP2016/072781
§ 371 (c)(1),
(2) Date: Apr. 20, 2018

(87) PCT Pub. No.: WO2017/067741
PCT Pub. Date: Apr. 27, 2017

(65) Prior Publication Data
US 2018/0231435 A1     Aug. 16, 2018

(30) Foreign Application Priority Data

Oct. 22, 2015   (DE) .................. 10 2015 220 674

(51) Int. Cl.
*G01M 17/007* (2006.01)
*G01M 17/02* (2006.01)

(52) U.S. Cl.
CPC ...... *G01M 17/022* (2013.01); *G01M 17/0074* (2013.01)

(58) Field of Classification Search
USPC ............... 73/116.01, 116.05, 116.06, 116.07, 73/116.08, 116.09, 116.11, 118.01
See application file for complete search history.

(56) References Cited

U.S. PATENT DOCUMENTS 1,478,532 A     12/1923   Schafer
4,843,895 A  *  7/1989   Harper .............. G01M 17/0074
                                                   73/865.9
(Continued)

FOREIGN PATENT DOCUMENTS

DE     94 05 141 U1    5/1994
DE     197 04 606 A1   8/1998
(Continued)

OTHER PUBLICATIONS

German Search Report Corresponding to 10 2015 220 674.2 dated Nov. 28, 2016.
(Continued)

*Primary Examiner* — Eric S. McCall
(74) *Attorney, Agent, or Firm* — Davis & Bujold PLLC; Michael J. Bujold

(57) ABSTRACT

A rotating drum of a tire, wheel and/or chassis test stand, with an essentially cylindrical running surface (15). The rotating drum of a tire having a hub, side disks arranged on the hub, which in the area of their circumference (3a, 4a) have fixing areas, and a plurality of segments (7) which form the running surface (15) of the rotating drum (1,21). The plurality of segments (7) are arranged on the circumference (3a, 4a) of the fixing areas and are connected to the side disks.

20 Claims, 4 Drawing Sheets

(56) References Cited

U.S. PATENT DOCUMENTS

| | | | |
|---|---|---|---|
| 5,218,914 A * | 6/1993 | Dickinson | A47B 87/0223 |
| | | | 108/186 |
| 5,775,187 A * | 7/1998 | Nikolai | B23P 15/26 |
| | | | 82/1.11 |
| 9,421,748 B2 | 8/2016 | Hutchinson De Staercke et al. | |
| 2009/0193909 A1* | 8/2009 | Ichige | G01M 17/0072 |
| | | | 73/862.08 |
| 2012/0204633 A1* | 8/2012 | Martin | G01M 17/024 |
| | | | 73/146 |
| 2019/0083023 A1* | 3/2019 | Gomi | A61B 5/221 |

FOREIGN PATENT DOCUMENTS

| | | |
|---|---|---|
| DE | 10 2009 002 169 A1 | 10/2010 |
| DE | 10 2011 117 876 A1 | 5/2013 |
| EP | 2 784 469 A1 | 10/2014 |
| JP | H0321844 A | 1/1991 |
| WO | 2013/101134 A1 | 7/2013 |

OTHER PUBLICATIONS

International Search Corresponding to PCT/EP2016/072781 dated Dec. 21, 2016.
Written Opinion Corresponding to PCT/EP2016/072781 dated Dec. 21, 2016.

* cited by examiner

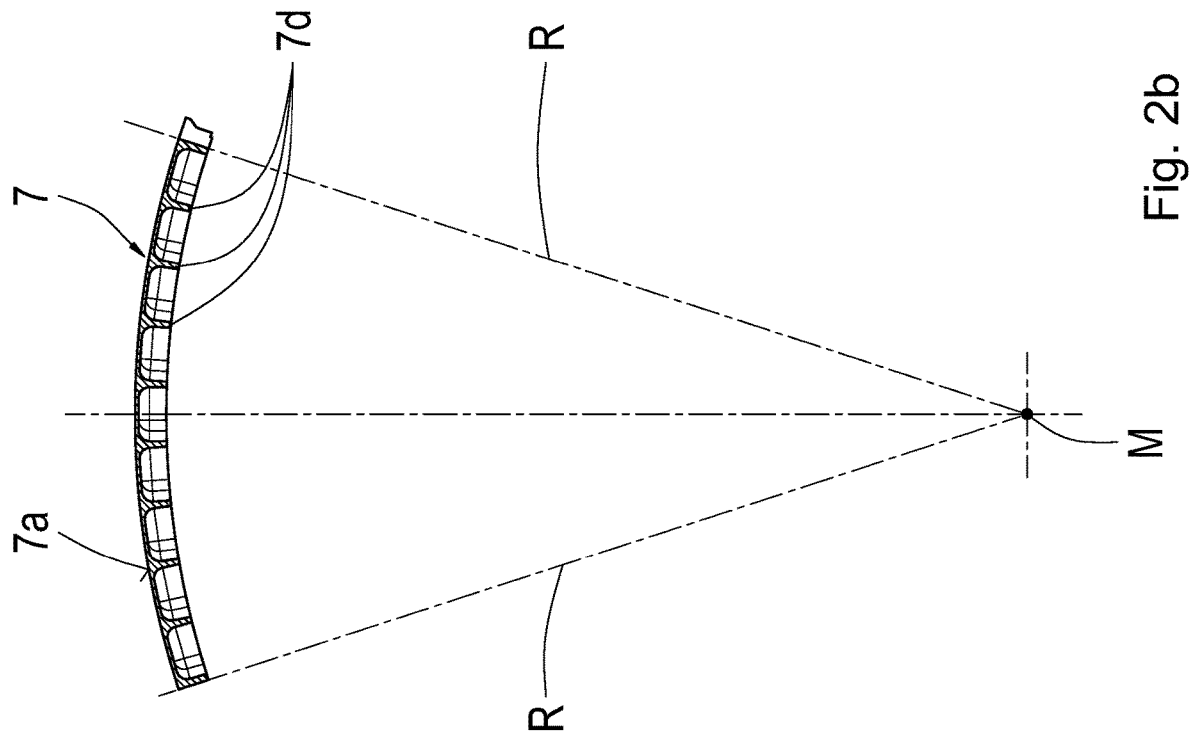
Fig. 2b
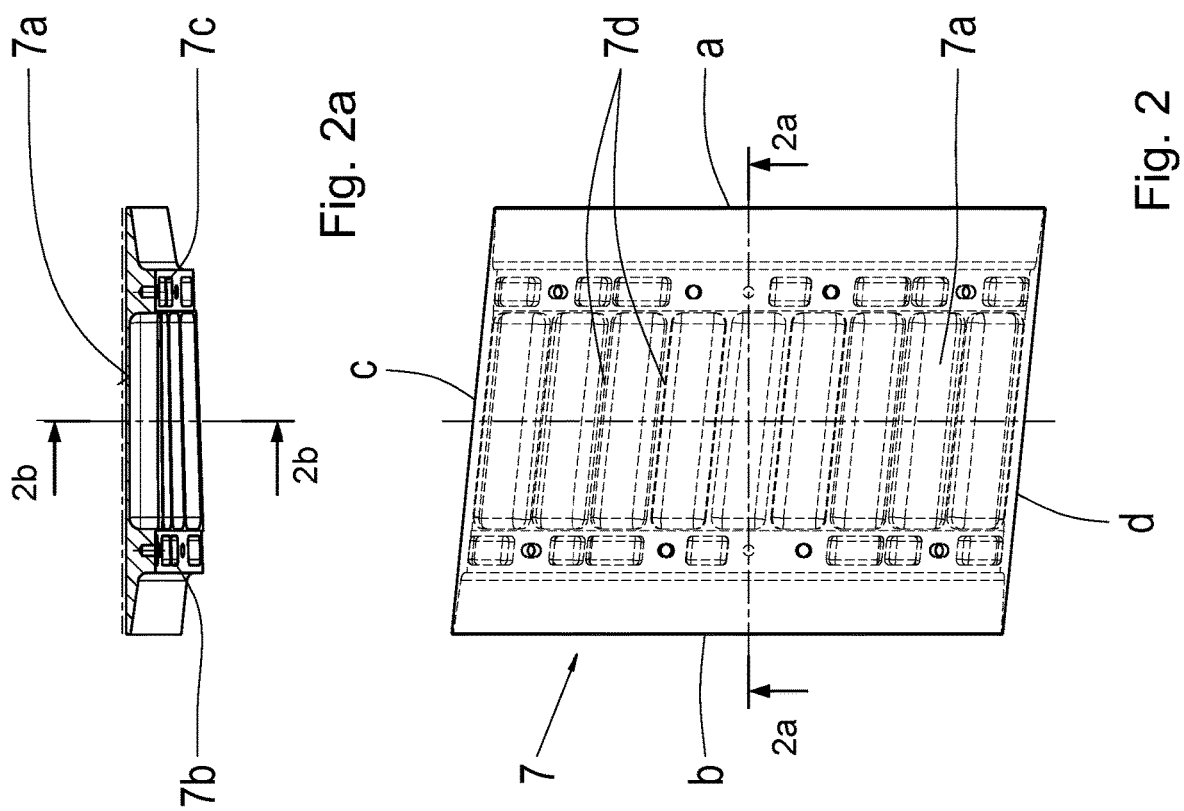
Fig. 2a
Fig. 2

ROTATING DRUM OF A TIRE, WHEEL, AND/OR CHASSIS TEST STAND

This application is a National Stage completion of PCT/EP2016/072781 filed Sep. 26, 2016, which claims priority to German patent application serial no. 10 2015 220 674.2 filed Oct. 22, 2015.

FIELD OF THE INVENTION

The invention relates to a rotating drum of a tire, wheel and/or chassis test stand, with an essentially cylindrical running surface.

BACKGROUND OF THE INVENTION

Test stands for tires are known, for example from DE 10 2009 002 169 A1 by the present applicant. A vehicle wheel, i.e. a tire fitted onto a wheel rim, which is held in a wheel suspension device, runs on a running surface that simulates the road, which surface is formed by the circumference of a rotating drum. The rotating drum is stationary and arranged to rotate on an axle, and is driven in its rotational direction to produce circumferential speeds of the running surface that correspond to the speeds of the vehicle. The wheel suspension device, which is modeled on a chassis, presses the wheel with relatively high contact pressure forces in the single-figure ton range against the running surface of the rotating drum. It is known for the running surface to be made as a drum shell surface continuous in the circumferential direction, which is provided with a coating suitable for simulating the properties and frictional behavior of the road. During operation of the test stand the coating undergoes wear, so that it has to be renewed from time to time. A problem which the present invention addresses is that renewing the coating of a rotating drum, which is relatively large and heavy, entails great deal of effort and is therefore relatively costly. Either the complete rotating drum has to be taken to the coating establishment, or the coating is applied by the caster on site, which also presents problems.

SUMMARY OF THE INVENTION

An objective of the present invention is to keep the time and costs entailed for renewing the coating or lining of the running surface of a rotating drum as low as possible.

The objective of the invention is achieved by the characteristics specified in the independent claims. Advantageous features emerge from the subordinate claims.

According to the invention, it is provided that the running surface consists of a plurality of segments, each attached directly at the circumference of the side disks. Thus, in contrast to the known prior art, the rotating drum according to the invention does not have a continuous drum shell formed as a separate component onto which the coating is applied, but rather, a running surface which is "segmented" in the circumferential direction. The advantage of this "segmentation" is that for renewal of the coating the detachably fixed segments can be taken off individually and either taken to the coating establishment where they are coated, or coated on site. The transport and coating of individual segments can be carried out much more simply and quickly. Moreover, in each case a set of newly coated segments, i.e., enough for a complete running surface, can be kept in store so that in each case a quick exchange of the worn for the newly coated segments can be carried out. In that way the tire test stand can start operating again after a short interruption, thereby increasing the utility of the test stand. A further advantage of the segmented structure is that the mass moment of inertia of the structure consisting of the rotating drum and segments tends to be lower compared with known tire test stands. Since during test operation the rotating drum is regularly accelerated and decelerated, this results in comparatively lower energy consumption.

According to a preferred embodiment, in their circumferential area the side disks are made of thicker material or with a larger cross-section, to serve as a fixing area. The fixing areas of the side disks preferably have first cylindrical joining surfaces at their circumference which preferably correspond with second cylindrical joining surfaces fixed to the inside of the segments. This achieves an accurate fit.

In a further preferred embodiment, radially directed first fixing holes are arranged in the thickened areas and second fixing holes aligned therewith are arranged in the second joining surfaces. The longitudinal axes of the fixing holes lie in the area of the central planes of the side disks. The segments are connected directly to the side disks by means of fixing screws inserted into the first and second fixing holes. Thus, the centrifugal forces imposed by the fixing screws are led directly into the area of the central planes of the side disks. The fixing of the segments therefore produces essentially only tensile forces and no bending moments. Thus, the loading of the side disks is kept relatively low.

In a further preferred embodiment, stiffening elements, preferably in the form of ribs or rib plates are arranged between the side disks. The ribs are solidly connected to the side disks and preferably also to the hub. This gives the advantage that the side disks are arranged on the hub in a stable and dimensionally precise manner, which is important for the assembly and removal of the segments.

According to a further preferred embodiment, the individual segments are shaped approximately as parallelograms, i.e. they have parallel long edges and parallel abutment edges at the ends, which are, however, oblique relative to the axial direction. This gives the advantage that as the tire rolls over the running surface of the rotating drum, no impacts and associated noise occur, but rather, the rolling behavior is smoother. Between the abutment edges a minimum expansion gap is left in order to compensate expansions in the circumferential direction that take place during the operation of the rotating drum.

In another preferred embodiment, the segments have an essentially smooth outer surface that can be coated with a lining. The outer surface with its lining simulates the road on which the tire rolls. The lining undergoes wear and is therefore renewed from time to time. The application of a new coating on a segment can be done relatively conveniently compared with coating a complete rotating drum. Thus, once dismantled the segments can be coated on site by the operator himself with appropriate equipment. Furthermore, it is possible for only some worn or damaged segments to be taken off and recoated.

In a further preferred embodiment the segments are ribbed on the inside, i.e. they have an essentially radially directed ribbed structure, which increases the moment of resistance of the segments, which are loaded by the pressure force of the tire, while at the same time keeping the mass moment of inertia of the rotating drum small. The segments are preferably made of steel plates, with which the ribbing on the inside can be produced by machining.

According to a further preferred embodiment, the rotating drum can be fixed by its hub onto a driveshaft and driven thereby. The driveshaft transmits to the rotating drum, on the one hand, the bearing forces that result from the tire pressure forces, and, on the other hand, the drive power required for operating the test.

According to another preferred embodiment, apertures are arranged radially inside the first fixing holes in the side disks and serve as assembly openings for fitting the fixing screws. The screws are pushed though from the inside outward, i.e., they are first inserted into the first fixing holes in the form of through-going plain holes and then screwed into the second fixing holes in the form of threaded blind holes. The assembly openings provide enough space for fitting on a suitable wrench.

In a further, alternative embodiment, the fixing area can also be in the form of a ring flange that projects laterally from the side disks and so forms an annular cylindrical surface. The segments are fitted and fixed onto that surface, which serves as the joining surface for the segments.

According to a further preferred embodiment, the rotating drum is made of steel or aluminum. Also preferably, the segments are made of steel or aluminum. It is possible but not necessary that both the rotating drum and its segments consist of the same material. For example, the drum could be of steel and the segments of aluminum.

If the rotating drum or its segments are made of aluminum, they are preferably produced by a casting process.

According to a further preferred embodiment, the segments have a road-like surface structure. That surface structure can for example be created during the production of the segments, in particular cast into the surface during the casting of the segments. In such a case, the segments will have a homogeneous material structure, for example aluminum or steel.

Alternatively, however, the segments can first be made with a recess in their surfaces, which, to form the road-like surface structure is later filled in with an epoxide resin-grit mixture. In such a case the segments do not have a homogeneous material structure, since they consist of the epoxide-grit mixture and, for example, aluminum or steel.

BRIEF DESCRIPTION OF THE DRAWINGS

Example embodiments of the invention are shown in the drawings and will be described in greater detail below, so that from the description and/or the drawings further features and/or advantages can emerge. The drawings show:

FIG. 2a: An axial section through the segment along the plane 2a-2a in FIG. 2, FIG. 2b: A radial section though the segment along the plane 2b-2b in FIG. 2a, FIG. 3: A half axial section through the rotating drum, with its segments fitted.

DETAILED DESCRIPTION OF THE PREFERRED EMBODIMENTS

Figure 1A:
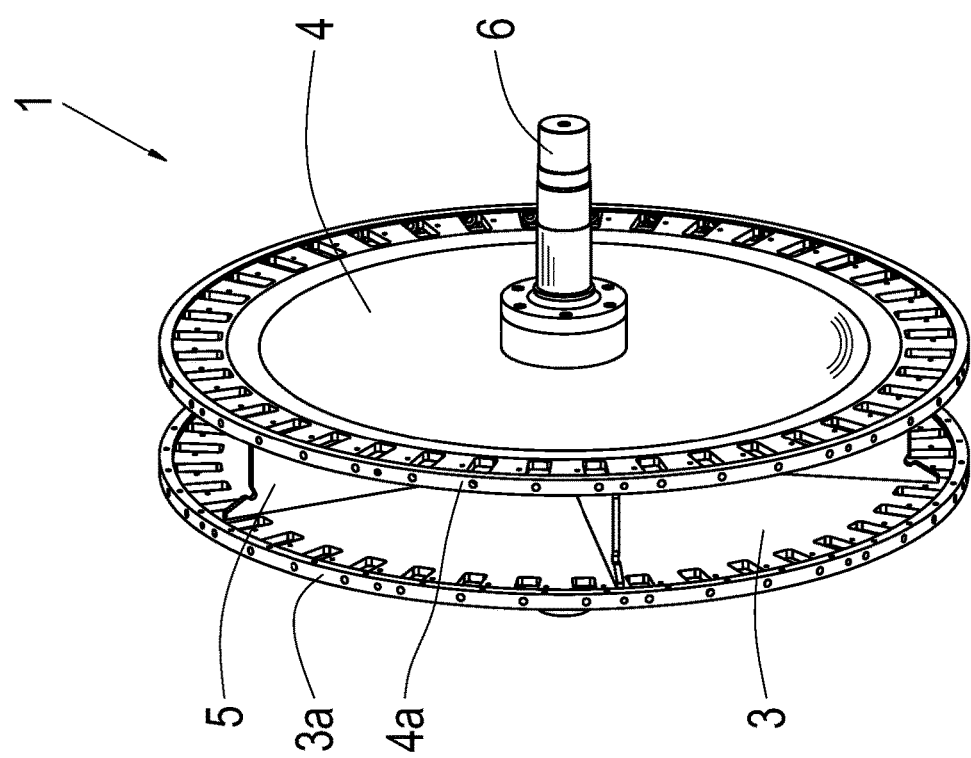
FIG. 1a: A 3-D representation of the rotating drum according to FIG. 1, FIG. 2: A segment of the rotating drum, viewed from above.
Figure 1:
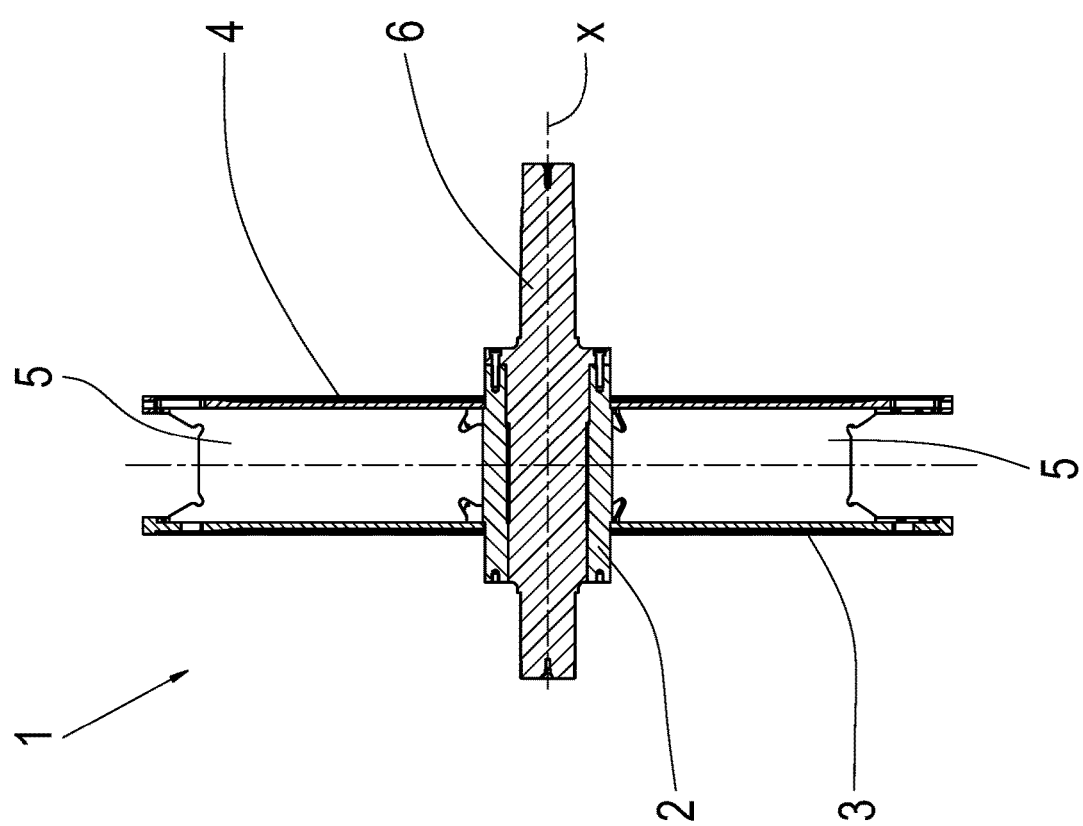
FIG. 1: An axial section of a rotating drum according to the invention, without its running surface.

FIG. 1 shows an axial section of a rotating drum 1 according to the invention—without segments, which are not shown here (compare FIG. 2). The (incomplete) rotating drum 1 shown in FIG. 1 comprises a hub 2, on which two mutually parallel side disks 3, 4 are arranged a distance apart. Between the two side disks 3, 4 stiffening elements in the form of ribs or rib plates 5 are arranged, which are connected to both side disks 3, 4 and also optionally to the circumference of the hub 2. The hub 2 is attached fixed both rotationally and axially to a driveshaft 6 with a rotational axis x.

FIG. 1a shows the rotating drum 1 represented in 3-D, wherein the two mutually parallel side disks 3, 4, the rib plates 5 and the driveshaft 6 can be seen clearly. At their circumference the side disks 3, 4 have respective first cylindrical joining surfaces 3a, 4a.

FIG. 2 shows a segment 7 according to the invention, as viewed from above, i.e. in the direction toward the rotational axis of the rotating drum. The segment 7 has the shape of a parallelogram with two mutually parallel long edges a, b extending in the circumferential direction and two abutment edges c, d at its ends that extend obliquely to the axial direction. The angle of obliqueness can be around 5 to 10 degrees relative to the rotational axis. On its outer side, the running side, the segment 7 has an essentially smooth surface 7a onto which a preferably metallic coating (not shown) can be applied. The coating can have a special surface structure that simulates the road.

According to another example embodiment not illustrated in the figures, the abutment edges c, d are perpendicular to the long edges a, b.

FIG. 2a shows an axial section through the segment 7 along the plane 2a-2a in FIG. 2. From the drawing it can be seen that in this section plane the surface 7a that can be coated extends essentially straight. On the side of the segment 7 facing toward the rotational axis, namely the inside, there are arranged second cylindrical joining surfaces 7b, 7c which correspond with the first cylindrical joining surfaces 3a, 3b (FIG. 1a).

FIG. 2b shows a radial section along the plane 2b-2b in FIG. 2a, i.e. in the central area of the segment 7. As can be seen from the drawing, the surface 7a of the segment 7 is curved, with a radius R that corresponds to the radius of the rotating drum. The point at which the rotational axis of the rotating drum passes through the plane of the drawing is marked M in FIG. 2b. The inside of the segment 7, i.e. its side facing toward the mid-point M, has ribbing 7d wherein the individual ribs are directed essentially radially and—as shown in FIG. 2 by, the broken lines—obliquely to the axial direction, i.e. parallel to the abutment edges c, d. By virtue of this ribbing 7d, on the one hand, the weight is reduced and, on the other hand, a high resistance moment against sagging of the segment 7 is achieved.

Figure 3A:
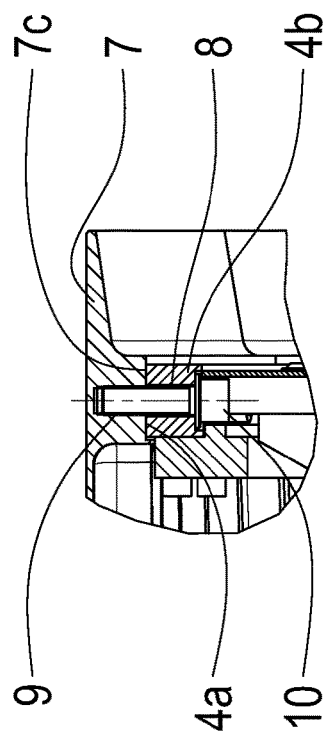
FIG. 3a: A detail Z from FIG. 3, FIG. 3b: A partial section along the section plane 3b-3b in FIG. 3, FIG. 4: A 3-D representation of the rotating drum with some of the segments removed.
Figure 3B:
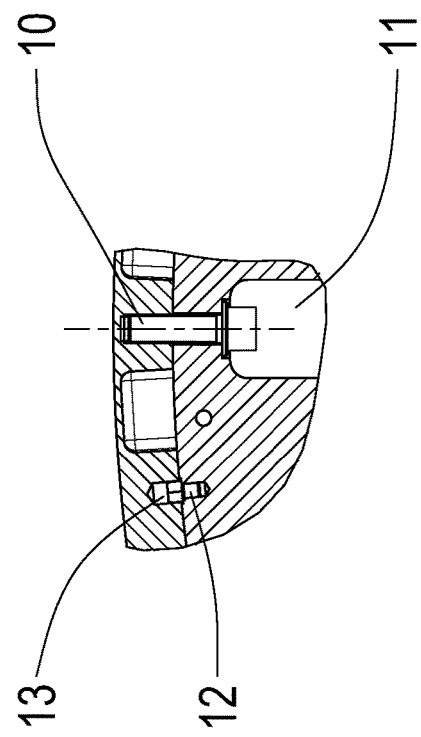
Figure 3:
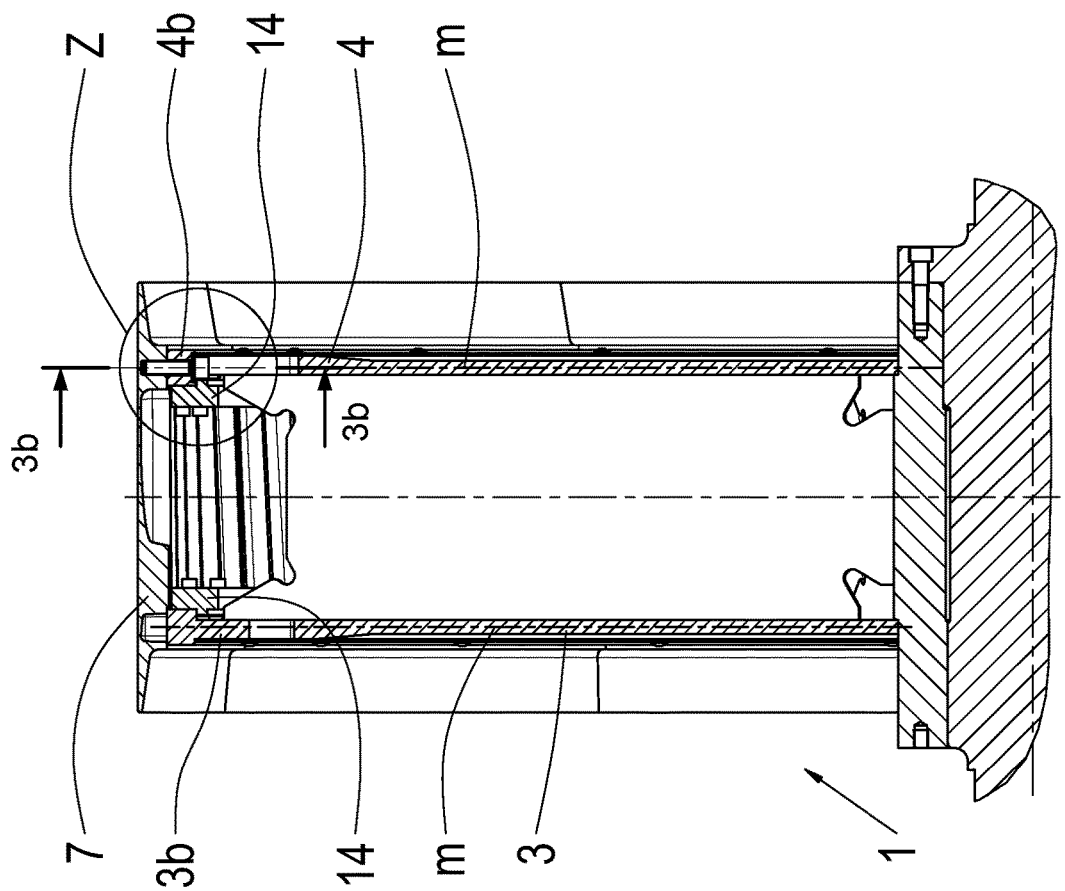

FIG. 3 shows the rotating drum 1 in a haft-axial section in the fully assembled condition, i.e. with its segments 7 fixed onto the side disks 3, 4. In their outer circumferential area the side disks 3, 4 have fixing areas 3b, 4b in the form of thickened areas of material, these being shown on the one hand as a detail Z in FIG. 3a and on the other hand as an enlarged partial section along the plane 3b-3b in FIG. 3b. In the fixing areas 3b, 4b are arranged first radially extending fixing holes 8 in the form of through-holes, whereas aligned with the first fixing holes 8, in the segments 7 second fixing holes in the form of blind holes are provided. The segments 7 are fixed to the side disks 3, 4 by means of fixing screws 10 fitted into the fixing holes 8, 9, so that the first and second joining surfaces 4a, 7c fit precisely one against the other. The representation of the fixing shown in FIG. 3a applies for both side disks 3, 4 in like manner. On the insides of the side disks 3, 4 balancing weights 14 are arranged, by means of which the rotating drum 1 can be balanced as much as possible before the segments 7 are fitted.

As viewed in the radial direction, the side disks 3, 4 have an approximately constant wall thickness with a central plane m. As can be seen from FIGS. 3 and 3a, the fixing areas 3b, 4b are arranged approximately symmetrically relative to the central plane m of the side disks 3, 4. As a result, the longitudinal axes of the fixing screws 10 also lie approximately along the central plane m. The centrifugal forces occurring during operation are therefore transferred directly into the cross-section of the side walls 3, 4. Thus, bending moments and bend loading of the material that would result therefrom are therefore avoided.

In FIG. 3b, radially on the inside of the fixing screw 10 an aperture 11 can be seen in the side disk 4, which serves as an assembly opening for fitting a tool for the fixing screw 10. As can be seen from the drawing, the fixing screw 10 is inserted from the inside outward and then tightened. For the exact positioning of the segments 7 on the side disks 3, 4, fitting elements, preferably fitting pins arranged in fitting holes are provided. FIG. 3b shows one such fitting pin 12 and a fitting hole 13 into which it fits.

Figure 4:
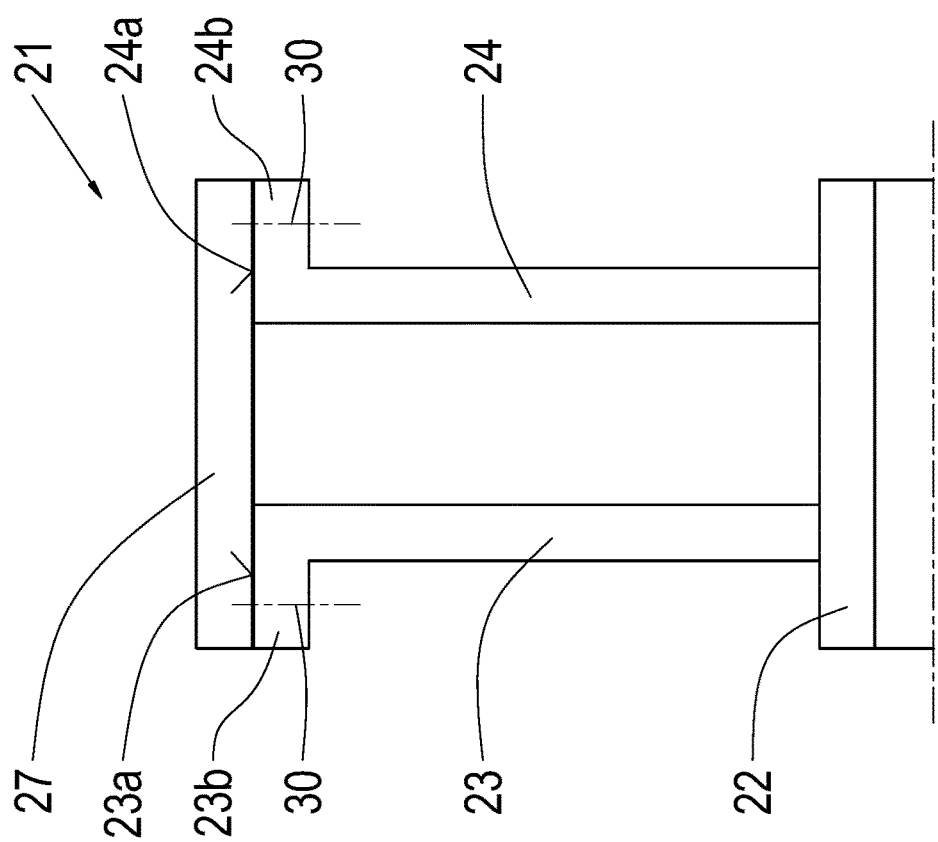

FIG. 4 shows the rotating drum 1 with an incomplete running surface 15 formed by a plurality of segments 7 arranged in the circumferential direction. In this case, to clarify the representation some segments have been omitted. In a preferred embodiment of the rotating drum 1, which can have a diameter of 2 m, ten segments 7 are provided around the circumference, three of which have been omitted for representational reasons. On the exposed first cylindrical joining surfaces 3a, 4a, the first fixing holes 8 distributed around the circumference can be seen, as well as the associated apertures 11. The apertures 11 can be covered after assembly, for example to reduce noise. Between the obliquely directed abutment edges c, d minimal expansion gaps (not shown) are left.

The rotating drum 1 is preferably used on a tire and/or chassis test stand (not shown). The rotating drum 1 has a running surface 15 made of segments 7 on which a tire to be tested (not shown) rolls. To avoid impacts at the transitions from one segment to the next, the abutment edges c, d are positioned obliquely relative to the rolling direction. The surface 7a of the segments 7 is coated for carrying out the test process, the coating having a particular surface structure in order to simulate the road. Owing to the high wheel contact forces the coating undergoes wear and must therefore be renewed at regular intervals. According to the invention this is done by taking off the segments 7, which can then be coated individually and then joined again to the side disks to form a completely new running surface.

Figure 5:
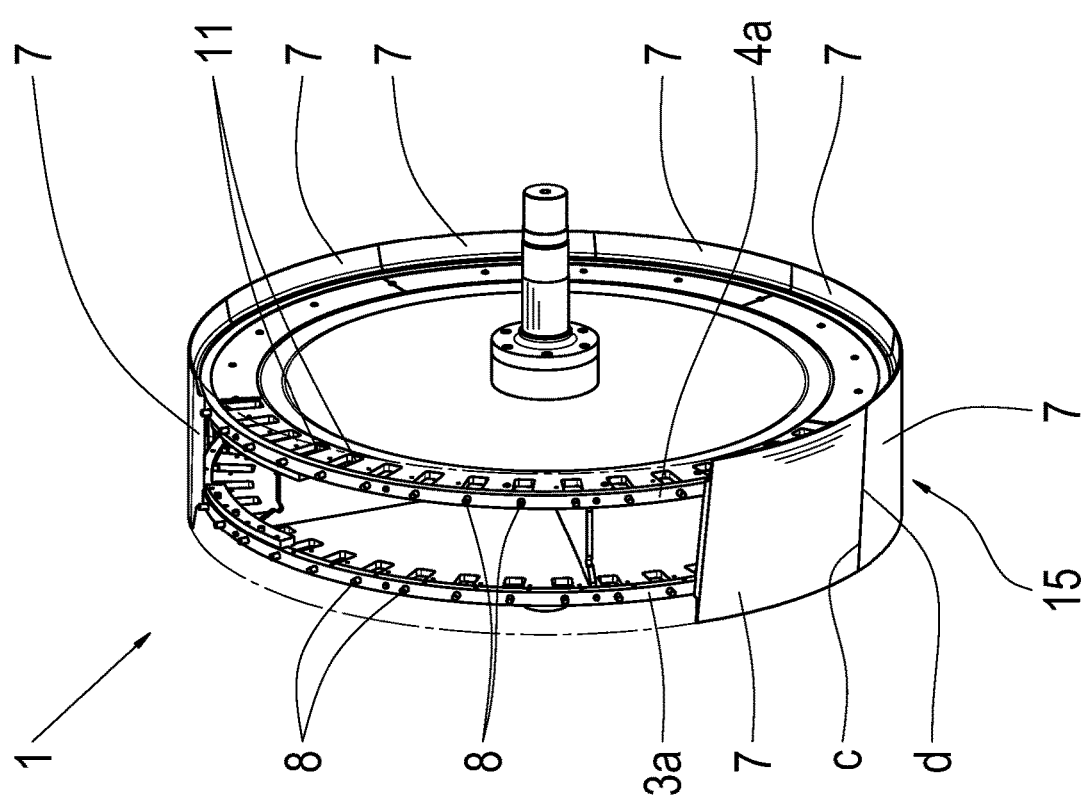
FIG. 5: A second embodiment of the invention with the segments fixed to an annular flange.

As a second example embodiment of the invention FIG. 5 shows schematically a half-section of a rotating drum 21. For the same or analogous components the same indexes as in the previous figures, but increased by 20, are used. On a hub 22 two side disks 23, 24 are fixed, these having fixing areas 23b, 24b in the form of annular flanges that project perpendicularly from the sidewalls 23, 24 and form first cylindrical joining surfaces 23a, 24a. A segment 27, which has corresponding second joining surfaces (not indexed), is connected to the side disks 23, 24 via the annular flanges 23b, 24b by means of schematically represented fixing screws 30.

INDEXES

1 Rotating drum
2 Hub
3 Side disk
3a First cylindrical joining surface
3b Fixing area
4 Side disk
4a First cylindrical joining surface
4b Fixing area
5 Rib plate
6 Driveshaft
7 Segment
7a Outer surface
7b Second cylindrical joining surface
7c Second cylindrical joining surface
7d Ribbing
8 First fixing hole
9 Second fixing hole
10 Fixing screw
11 Aperture
12 Fitting pin
13 Fitting hole
14 Balancing weight
15 Running surface
21 Rotating drum
22 Hub
23 Side disk
23a First cylindrical joining surface
23b Fixing area
24 Side disk
24a First cylindrical joining surface
24b Fixing area
a Long edge
b Long edge
c Abutment edge
d Abutment edge
m Central plane
x Rotational axis
M Mid-point
R Radius
Z Detail

The invention claimed is:

1. A rotating drum of a tire, wheel and/or chassis test stand having an essentially cylindrical running surface, the rotating drum comprising:
   a hub;
   side disks, being arranged on the hub which, in an area of their circumference, the side disks have fixing areas wherein first fixing holes are arranged on the fixing areas;
   a plurality of segments forming the running surface of the rotating drum, and the plurality of segments being arranged on a circumference of the fixing areas and being connected to the side disks;
   wherein the first fixing holes are arranged in a respective first joining surface of the side disks for attaching the segments, the segments having a second joining surface, and second fixing holes are arranged in the second joining surface of the respective segments;
   the segments are connected to the side disks by fasteners that are positioned in the first fixing holes and in the second fixing holes;
   the first fixing holes are through-holes; and
   the second fixing holes, in the second joining surface of the segments, are blind holes.

2. The rotating drum according to claim 1, wherein the hub is fixable onto a driveshaft.

3. The rotating drum according to claim 1, wherein the fixing areas are in a form of thickened parts of the side disks.

4. The rotating drum according to claim 3, wherein the segments each have ribbing on an inner side facing toward the rotational axis.

5. The rotating drum according to claim 3, wherein each of the side disks has a respective central plane arranged perpendicularly to a rotational axis (x) of the rotating drum, and the thickened parts, are formed approximately symmetrically relative to the central plane of the respective side disk.

6. The rotating drum according to claim 5, wherein longitudinal axes of the first fixing holes are aligned along the central plane of the respective side disk.

7. The rotating drum according to claim 3, wherein the first fixing holes extend radially through the thickened parts.

8. The rotating drum according to claim 7, wherein, in the side disks, assembly openings in a form of apertures are arranged radially on an inside of the first fixing holes.

9. The rotating drum according to claim 1, wherein stiffening elements are arranged between the side disks.

10. The rotating drum according to claim 9, wherein the stiffening elements are in a form of ribs, which are distributed around the circumference of the side disks and are either connected to the side disks or connected to the side disks and the hub.

11. The rotating drum according to claim 1, wherein the fixing areas of the side disks are in a form of annular flanges which project laterally from the side disks.

12. The rotating drum according to claim 11, wherein the segments are attached to the annular flanges.

13. The rotating drum according to claim 1, wherein the segments have long edges which extend in a circumferential direction and abutment edges that extend obliquely to a rotational axis of the rotating drum.

14. The rotating drum according to claim 13, wherein the fasteners extend radially only partially through the segments towards the running surface of the rotating drum.

15. The rotating drum according to claim 13, wherein fitting pins are arranged at the circumference of the side disks and extend radially outward from the first joining surfaces thereof, and the segments have fitting holes that extend from the second joining surfaces only partially through the segments, the fitting pins are received by the fitting holes for positioning of the segments on the side disks.

16. The rotating drum according to claim 13, wherein the segments are arranged around a circumference of the running surface, abutting edge to abutting edge, and leaving an expansion gap therebetween.

17. The rotating drum according to claim 13, wherein the segments have an essentially smooth, outer surface which is coated with a lining.

18. The rotating drum according to claim 13, wherein the segments are fixable onto the side disks by fitting pins that correspond with respective fitting holes.

19. The rotating drum according to claim 18, wherein the fasteners comprise fixing screws that extend through the first fixing holes and are received within the second fixing holes, the fitting pins being different from the fixing screws and the fitting holes being different from the first fixing holes and the second fixing holes.

20. A rotating drum of a tire, wheel and/or chassis test stand having an essentially cylindrical running surface, the rotating drum comprising:
a hub;
side disks being arranged on the hub which, in an area of their circumference, the side disks have fixing areas on which first fixing holes are arranged, the first fixing holes are through-holes and are arranged in a first joining surface of the side disks; and
a plurality of segments forming the running surface of the rotating drum, the plurality of segments each have a second joining surface in which second fixing holes are arranged, the second fixing holes in the second joining surface of the plurality of segments are blind holes, and the plurality of segments being arranged on a circumference of the fixing areas and being connected to the side disks by fasteners that extend through the first fixing holes and are received by the second fixing holes, wherein the segments have ribbing on an inner side facing toward the rotational axis.

* * * * *